Sept. 9, 1969   J. BASSOT ET AL   3,465,731
ELECTRONIC CONTROL FOR ELECTROMAGNETIC INJECTION SYSTEMS
Filed Sept. 28, 1967   2 Sheets-Sheet 1

Inventors:
Jacques Bassot
Louis Monpetit
By Michael S. Striker
Attorney

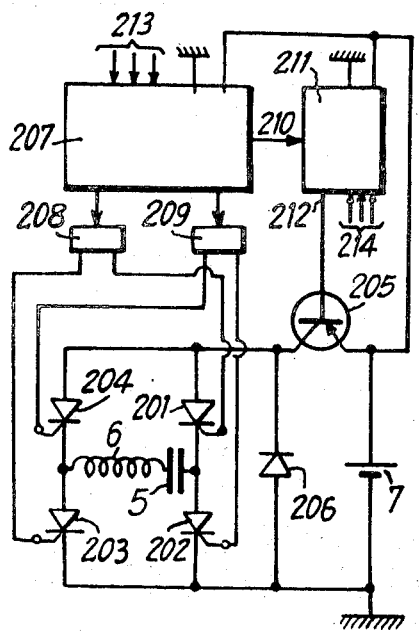
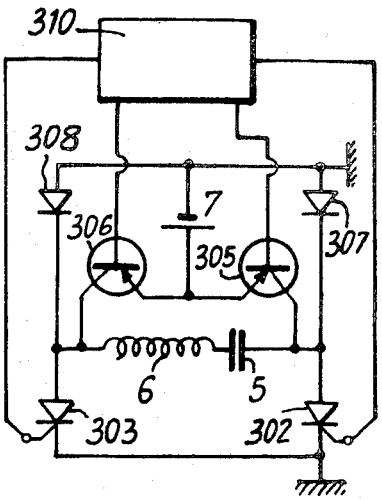
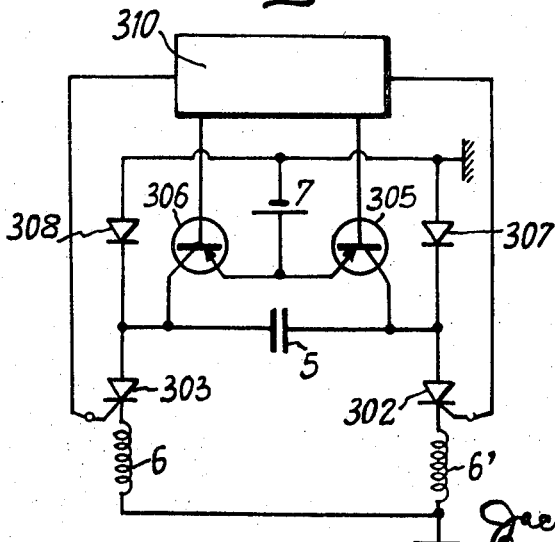

United States Patent Office 3,465,731
Patented Sept. 9, 1969

3,465,731
ELECTRONIC CONTROL FOR ELECTRO-
MAGNETIC INJECTION SYSTEMS
Jacques Bassot, Paris, and Louis Monpetit, Etang-la-Ville,
France, assignors to Societe des Procedes Modernes
d'Injection Sopromi, Societe Anonyme, de Nationalite
Francaise, Boulogne, France
Filed Sept. 28, 1967, Ser. No. 671,504
Claims priority, application France, Sept. 30, 1966,
78,306
Int. Cl. F02d *1/06, 7/00*
U.S. Cl. 123—32  13 Claims

ABSTRACT OF THE DISCLOSURE

An oscillating circuit containing at least a capacitor and the coil of the electromagnetic injector. Switches for allowing current flow through the oscillating circuit. A half period of oscillation for each switching. Two switches operated alternately so that the polarity of the oscillation changes with each interruption. Frequency of occurrence and amplitude of the oscillations controlled as a function of the quantity of liquid to be injected.

CROSS-REFERENCE TO RELATED APPLICATION

The present invention relates to improvements and further developments of injection control systems disclosed in our application Ser. No. 630,035, entitled "A High Speed Fuel Injection System," and filed on Apr. 11, 1967.

Said application is assigned to the assignee of the present invention.

BACKGROUND OF THE INVENTION

This invention relates to an electronic control system for injection systems having electromagnetic injection means.

Electronic control systems for controlling the injection of fuel in internal combustion engines are known and it is also known that a timed injection may take place wherein the total quantity of fuel to be injected is apportioned among a certain number of individual injections of which the duration and the number, that is to say of which the amplitude and frequency, are regulated as a function of the operating conditions of the motor.

SUMMARY OF THE INVENTION

It is the object of the present invention to supply an electrical system for this type of injection process. The system according to this invention is thus a system for control of injection in systems having electromagnetic injection valve means. Said injection valve means have a coil and are adapted to open upon energization, and close upon deenergization of said coil. It comprises a voltage source. It further comprises an oscillator circuit having at least said coil and capacitive means. Furthermore, electrical switching means are provided for connecting and disconnecting, respectively, said oscillator circuit to and from said voltage source. Said switching means comprise a first and second electrical switching element connected so that closing of said first switching element causes an oscillation of a predetermined polarity in said coil, and closing of said second switching element causes an oscillation of opposite polarity to the oscillation resulting from the closing of said first switching element. Finally, a switching control arrangement is provided for operating said first and second switching elements alternately. The frequency of said switching operations determines the frequency of occurrence of said oscillations and thus the frequency of the injections.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 5 is an electrical diagram showing a fourth embodiment of the present invention;

FIG. 6 is a variation of the circuit according to FIG. 5; and

FIG. 7 is a further variation of the circuit according to FIG. 5.

DESCRIPTION OF THE PREFERRED EMBODIMENTS

Figure 1:
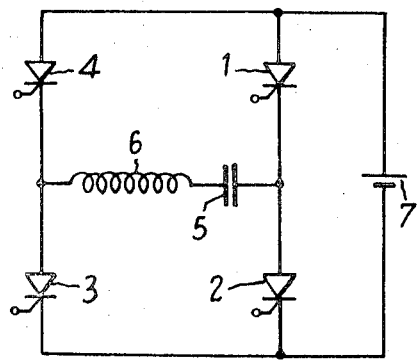
FIG. 1 is an electrical diagram showing one embodiment of the present invention.

In the figures, the reference number 6 refers to an electromagnetic injector coil, or several injector coils connected either in series or in parallel. The inductance 6 in series with a capacitor 5 forms an oscillator circuit, which constitutes one diagonal of a bridge circuit, whose other diagonal consists of a voltage source 7, for example the storage battery of a vehicle. The arms of the bridge consist of electronic switches such as thyratrons or thyristors 1 to 4. The thyristors are activated in pairs, for example, 1 and 3 are first fired and after a certain lapse of time, the other pair, or thyristors 2 and 4, are fired. This is accomplished by means of a control arrangement which is not shown here, but embodiments of which will be presented below. Each time a pair of thyristors is fired, a half period of oscillation occurs in the oscillator circuit constituted by the condenser 5 and the inductance 6. The thyristors are self-extinguished after a half period, the next half period of oscillation being assured by the firing of the other pair of thyristors 2 and 4. For each oscillation, the injector 6 opens for a period of time determined by the characteristics of the circuit.

It is easy to see that after a transient starting period during which there is an accumulation of energy in the oscillating system, which consists of an increase of the maximum current in the inductance 6 and an increase of the maximum voltage across the terminals of the condensor 5, an equilibrium condition will result when the energy furnished during each cycle by the source 7 is equal to the energy dissipated in the circuit. The latter comprises both the mechanical work in the injector 6 and the heat losses (joule losses, dielectric losses, etc.).

However, in this arrangement, very high amounts of energy are generated and a poor efficiency results, since the energy is furnished with a high voltage across the capacitor 7 and throughout the whole oscillation, that is to say even during the occurrence of maximum current. Furthermore, the maximum current must pass through the source of energy.

The quantity of liquid injected each time is varied by changing the frequency of the recurrence of the pulses firing the two pairs of thyristors, changing the amplitude of the oscillations, or a combination of the two methods.

Figure 2:
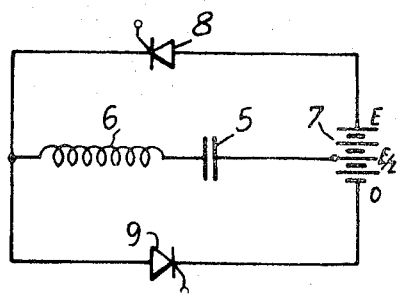
FIG. 2 is an electrical diagram showing a second embodiment of the present invention.
Figure 3:
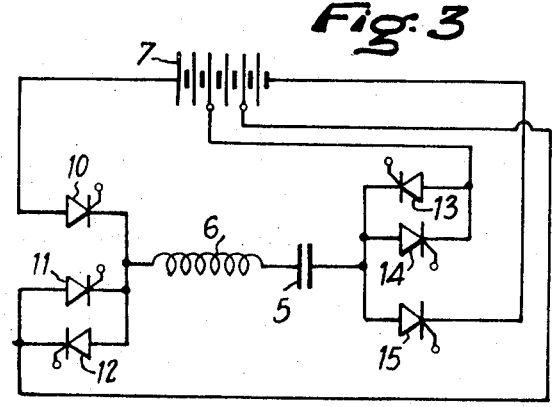
FIG. 3 is a variation of the circuit according to FIG. 2.

By making certain changes, as those shown in FIGS. 2 and 3, it is possible to effect an improvement in the efficiency. These changes consists of dividing the storage battery, connecting the oscillating circuit 5 and 6 to the midpoint of the energy source 7, and providing two thyristors 8, 9 for controlling the oscillations (FIG. 2). Alternatively, the storage battery 7 may be divided into three parts and three parts of thyristors 10, 14; 12, 13; and 11, 15 may be provided.

However, the latter entails an increase in the circuit elements and further creates certain difficulties in obtaining an even distribution of the energy drawn from the various source elements. Also the maximum current must still pass through the source.

Figure 4:
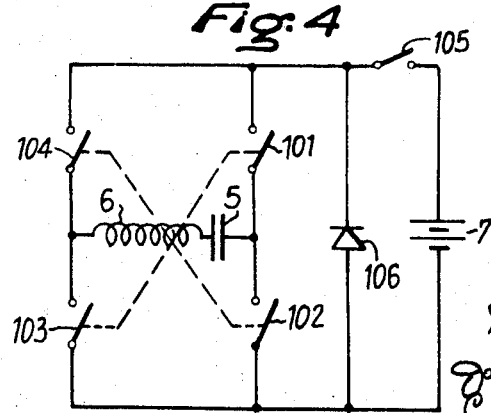
FIG. 4 is an electrical circuit showing a third embodiment of the present invention.

For these reasons, according to a preferential embodiment according to this invention (FIG. 4), an oscillating circuit is provided with a capacitor and at least one injector coil, which causes a half period oscillation for each pulse supplied at a chosen point of the circuit. The dissipated energy is reinjected into the system in each cycle by means of a source of electrical energy in the shape of rectangular pulses generated at approximately zero current. In this fashion, it is possible to attain very high values of efficiency.

By means of a system which is not shown, switch pairs 101 and 103, and 102 and 104 are closed alternately and opened after a half period of oscillation of the LC circuit consisting of the capacitor 5 and the coil 6. At the beginning of each closing cycle, a switch 105 is closed for a period of time, as necessary to maintain the oscillations. The energy source 7 is therefore connected to the oscillating circuit only when the switch 105 is closed, while the maximum current of the oscillations passes through the diode 106.

In one embodiment (FIG. 5), the switches 101 to 104 are thyristors 201 to 204, and the switch 105 is a transistor 205. First switching control arrangement 207 with two switching arrangement outputs 208 and 209 of the two output multivibrator types is provided, which alternately fires the two pairs of thyristors 201, 203 and 202, 204. It further activates the second switching control arrangement 211 each time by means of output 210, thus assuring the saturation of transistor 205 during a certain time period, consequently assuring the furnishing of a certain amount of energy to the circuit from the source 7.

First and second switching control arrangements 207 and 211 have switching control inputs 213 and 214 respectively, which allow the regulation of control of the frequency of injection by means of the arrangement 207 and of the duration of energy supply during each cycle and therefore the phase angle of the opening of the injector by means of arrangement 211. FIG. 6 shows an alternate arrangement wherein two of the thyristors were replaced by diodes 307 and 308. In this case, the oscillating circuit 5, 6 is always connected as a diagonal of the bridge consisting of the diodes 307, 308 and the thyristors 302 and 303 or, more specifically, having one terminal connected to the common point of thyristor 308 and diode 303 and the other terminal connected to the common point of diode 307 and thyristor 302. The terminals of the other bridge diagonal are connected to ground, while the source of energy is connected to the common point of the two diodes 307, 308 and on the other side to the common point of the emitters of transistors 305 and 306. The collectors of said transistors 305 and 306 are connected to the terminals of the oscillating circuit 5, 6. Switching control arrangement 310 alternately controls the gates of the thyristors 302 and 303. It also alternately controls the transistors 305 and 306 at the beginning of each closing cycle of thyristors 302 and 303 in order to allow energy to be transferred to the circuit from the energy source 7.

FIG. 7 shows a variation of the circuit according to FIG. 6 to show the control of two injectors 6, and 6', each of which is alternately connected to ground by means of thyristors 302 and 303 and which constitute an oscillating circuit in conjunction with capacitor 5.

While the invention has been illustrated and described as embodied in specific types of injection control circuits, it is not intended to be limited to the details shown, since various modifications, structural and circuit changes may be made without departing in any way from the spirit of the present invention.

Without further analysis, the foregoing will so fully reveal the gist of the present invention that others can, by applying current knowldege, readily adapt it for various applications without omitting features that, from the standpoint of prior art, fairly constitute essential characristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In a system for controlling the opening and closing of an injection valve in a fuel injection system, the injection valve having a coil and being adapted to open upon energization and close upon de-energization of the coil, the improvement comprising:
   a capacitor connected in series with the coil to provide a capacitor-inductor network,
   first and second terminals adapted to be connected to a source of current,
   switching means connected between said terminals and said capacitor-inductor network, said switching means when closed serving to cause current flow through said network from whatever current source is connected to said terminals, said switching means including first subsidiary switching means and second subsidiary switching means connected such that the closing of said first subsidiary switching means causes current flow in a first direction through said network and the closing of said second subsidiary switching means causes current flow in a second direction through said network, and
   first switching control means coupled to said switching means to operate said first and said second subsidiary switching means alternately.

2. The improvement of claim 1 further comprising:
   a direct current source connected between said terminals.

3. The improvement of claim 2 wherein:
   said current source is a battery having a center tap connected to a first end of said capacitor-inductor network,
   said first subsidiary switching means is a gated electric switch connected between said first one of said terminals and the second end of said network,
   said second subsidiary switching means is a gated electric switch connected between said second one of said terminals and said second end of said network,
   whereby the alternate gating of said switches will alternately turn on said switches to permit alternate directions of current flow through said network.

4. The improvement of claim 3 wherein said electric switches are unidirectional switches.

5. The improvement of claim 4 wherein said unidirectional switches are thyristors.

6. The improvement of claim 2 wherein:
   said first subsidiary switching means comprises first and second switches,
   said second subsidiary switching means comprises third and fourth switches,
   said first, second, third and fourth electric switches are connected in a bridge circuit, said first and second electric switches are in opposed legs of said bridge, said capacitor-inductor network is connected across a first diagonal of said bridge and said voltage source is connected across the second diagonal of said bridge,
   whereby the closing of said first and second switches will cause current flow in a first direction through said network and the closing of said third and fourth switches will cause current flow in a second direction through said network.

7. The improvement of claim 6 wherein said first, second, third and fourth switches are thyristors.

8. The improvement of claim 2 wherein said switching means comprises:
a plurality of pairs of switches each tapped to said current source to allow current from a fraction of said current source to flow through said capacitor-inductor network upon actuation of any one of said pairs of switches.

9. The improvement of claim 6 further comprising:
an additional switch connected between said bridge circuit and said current source,
second switching control means to generate a signal for closing said additional switch periodically during the time said switching means is closed for a time duration sufficient to supply the energy losses sustained during each injection, and
a diode connected across said second diagonal of said bridge to permit current flow from said bridge through said diode when said additional switch is open.

10. The improvement of claim 9 wherein said additional switch is a transistor.

11. The improvement of claim 9 wherein said second switching control means is coupled to said additional switch to close said additional switch at the beginning of each actuation of each of said first and second subsidiary switching means.

12. The improvement of claim 2 further comprising:
first and second unidirectional conducting elements, said first unidirectional conducting element connected between said first one of said terminals and a first end of said capacitor-inductor network, said second unidirectional conducting element connected between said first terminal and the second end of said network,
wherein said first and second subsidiary switching means comprise respectively first and second gated switches, said first gated switch connection between said first terminal and said first end of said network, and said second gated switch connected between said first terminal and said second end of said network,
a first additional controllable switch connected between said second terminal and said first end of said network,
a second additional controllable switch connected between said second terminal and said second end of said network, and
wherein said first switching control means is also coupled to said first and second additional controllable switches to alternately turn on said controllable switches in synchronism with the alternate gating on of corresponding ones of said gated switches.

13. The improvement of claim 2 wherein said system is adapted to control a plurality of injectors, each injector having a separate coil, further comprising:
means for connecting each of the separate injector coils to said capacitor in a predetermined sequence.

References Cited

UNITED STATES PATENTS

| | | | |
|---|---|---|---|
| 2,815,009 | 12/1957 | Pribble. | |
| 3,193,733 | 7/1965 | Orsino | 317—148.5 |
| 3,242,352 | 3/1966 | Long | 307—252 XR |
| 3,338,221 | 8/1967 | Scholl. | |

LAURENCE M. GOODRIDGE, Primary Examiner

U.S. Cl. X.R.

123—119, 139; 317—148.5